United States Patent [19]

Larsen et al.

[11] Patent Number: 4,857,424
[45] Date of Patent: Aug. 15, 1989

[54] ZINC ALKALINE ELECTROCHEMICAL CELLS WITH REDUCED MERCURY ANODES

[75] Inventors: Duane M. Larsen, McFarland; Robert B. Dopp, Madison, both of Wis.

[73] Assignee: Rayovac Corporation, Madison, Wis.

[21] Appl. No.: 255,606

[22] Filed: Oct. 11, 1988

[51] Int. Cl.⁴ .............................................. H01M 4/42
[52] U.S. Cl. ................................... 429/206; 429/224; 429/230; 429/198; 429/190; 29/623.1
[58] Field of Search .............. 429/230, 231, 229, 206, 429/224, 190, 198, 50, 57; 29/623.1

[56] References Cited

U.S. PATENT DOCUMENTS

| | | | |
|---|---|---|---|
| 2,897,250 | 7/1959 | Klopp | 429/229 X |
| 3,285,783 | 11/1966 | Gould | 429/198 |
| 3,291,645 | 12/1966 | Gould | 429/198 |
| 3,847,669 | 11/1974 | Paterniti | 429/206 |
| 4,377,625 | 3/1983 | Parsen et al. | 429/198 |
| 4,500,614 | 2/1985 | Nagamine et al. | 429/206 |
| 4,585,716 | 4/1986 | Chalilpoyil et al. | 429/230 X |
| 4,777,100 | 10/1988 | Chalilpoyil et al. | 429/230 X |

*Primary Examiner*—Anthony Skapars
*Attorney, Agent, or Firm*—Kenyon & Kenyon

[57] ABSTRACT

Alkaline zinc-manganese dioxide electrochemical cell containing a small amount of an organosiliconate additive as a means for reducing the amount of mercury used in the zinc amalgam. The organosiliconates added to the anode are film forming organic wetting agents and can be used in mercury containing anodic zinc gels containing other gas suppressors.

9 Claims, 1 Drawing Sheet

4,857,424

ZINC ALKALINE ELECTROCHEMICAL CELLS WITH REDUCED MERCURY ANODES

FIELD OF THE INVENTION

Our invention relates to alkaline zinc-manganese dioxide electrochemical cells, and more particularly relates to such electrochemical cells which contain a small amount of an organosiliconate additive as a means for reducing the amount of mercury used to stabilize the zinc-laden anodic material.

BACKGROUND OF THE INVENTION

Alkaline electrochemical cells having zinc anodes and manganese dioxide cathodes have become commercially important in recent years. Such cells, particularly when manufactured in the cylindrical configuration are very important sources of portable electrical energy. Alkaline zinc manganese dioxide cells provide substantially more energy vis-a-vis Leclanche cells when used in high current continuous discharge applications. For example, when compared to Leclanche cells of the same size, alkaline zinc-manganese dioxide cells deliver more than twice the usable power in light load conditions, such as the Light Industrial Flashlight (LIF) test, but up to eight times the usable power under heavy drains.

The principal factor for the increased capacity of alkaline-zinc manganese dioxide electrochemical cells is the presence of the alkaline electrolyte. In such cells, at least some of the alkaline electrolyte is mixed with the zinc, usually comprised of a fine powder, to form a gelled anodic mixture. The alkaline electrolytes, which usually comprise concentrated aqueous potassium hydroxide and a minor part of the zinc oxide, provide for more complete electrochemical reactions as compared with the electrolytes used in Leclanche cells.

It is well known that strong alkaline electrolytes such as concentrated potassium hydroxide oxidize, i.e., corrode, zinc upon contact. In fact, as soon as a zinc-alkaline electrochemical cell is closed during the manufacturing process, the oxidation of zinc by the alkaline electrolyte can occur. Therefore, unless steps are taken to impede the oxidation of the zinc, alkaline electrochemical cells may have little or no usable life once they are placed into service. The corrosion of the zinc anodic material by alkaline electrolyte correlates roughly with temperature, i.e., the higher the storage temperature of electrochemical cells having zinc anodes oxidizable by electrolyte, the more dramatic the decrease in cell capacity.

The oxidation of the zinc by the electrolyte can also undermine the structural integrity of small electrochemical cells. A by-product of the oxidation reaction between zinc and the electrolyte is hydrogen gas. If the hydrogen gas evolves at a very rapid rate the cell may explode. However, even if the cell does not explode, the build-up of hydrogen gas can so weaken the seals of the cell that it begins to leak.

Historically, small amounts of mercury, e.g., one part mercury for every seven to twelve parts zinc, have been added to the powdered zinc anodic material of alkaline zinc-manganese dioxide electrochemical cells to control the corrosion of zinc by alkaline electrolyte. Mercury, as it will do with most metals, combines with the zinc to form a zinc/mercury amalgam. It is well known that such zinc/mercury amalgams increase the hydrogen overvoltage, i.e., the voltage level at which hydrogen will be given off by a metallic element in contact with an acidic or an alkaline solution.

As the percentage of mercury in the zinc/mercury amalgam increases, the hydrogen overvoltage increases. Or, to put it another way, as the proportion of mercury in the amalgam increases, the rate at which zinc oxides and evolves hydrogen gas in presence of alkaline electrolyte decreases. Unfortunately, as evidence of the toxicity of mercury to man and other animals, and to the environment in general, becomes more well-known, it is becoming increasingly unacceptable to use mercury to solve the problem of the oxidation of zinc in the presence of alkaline electrolyte of alkaline zinc cells.

The problem of the oxidation of zinc in the presence of alkaline electrolytes in electrochemical cells is well-known and a myriad of solutions to the problem have been suggested. For example, U.S. Pat. No. 4,377,625 to Parsen et al. proposes the use of certain amine-containing chelating agents to suppress hydrogen gas evolution in alkaline (or acidic) galvanic cells. While the Parsen et al. reference stresses the unique nature of its solution to the problem of zinc corrosion, it also catalogs a number of other patents which propose at least partial solutions to the gas evolution problem in alkaline zinc electrochemical cells. Most of the solutions discussed in Parsen et al. provide for the addition of various compounds, often well-known hydrogen gas inhibitors, to the zinc anode. For example, U.S. Pat. No. 2,897,250 to Klopp suggests the use of 8-nitro quinoline and 8-chloro quinoline; U.S. Pat. Nos. 3,285,783, 3,291,645 and 3,291,646 to Gould suggest various nitrogen containing compounds which are comprised of aliphatic hydrocarbon radicals; and U.S. Pat. No. 3,963,520 to Bauer et al. suggests monocarboxylic acid containing at least two ethanolamide radicals. However, neither the Parsen et al. reference or any of the other references cited therein, suggest the use of a class of compounds which provide for a reduction in the amount of hydrogen gas evolving from the anode of alkaline-zinc manganese dioxide cells while simultaneously allowing for a reduction in the amount of mercury used in the amalgamated zinc containing anodes of such cells.

The reduction of the amount of mercury in alkalineo zinc manganese dioxide cells is the focus of U.S. Pat. No. 3,847,669 to Paterniti. In the Paterniti reference, the amount of mercury incorporated into the anode mixture of alkaline zinc manganese dioxide cells can be reduced by adding at least 0.01% by weight zinc of an ethylene oxide polymer to the cell. The solution suggested by Paterniti, however, suggests that the zinc anodes contain up to 8 percent by weight mercury. By today's increasingly rigid environmental standards, it is unacceptable to provide for alkaline electrochemical cells containing eight percent mercury. Therefore, in spite of the zinc anode additive taught in Paterniti, further reductions in the amount of mercury used in alkaline zinc electrochemical cells must be developed.

OBJECTS OF THE INVENTION

Accordingly, it is a primary object of our invention to provide a means for reducing the amount of mercury used in alkaline zinc-manganese dioxide electrochemical cells.

Another object of our invention is to provide a reduced mercury containing zinc manganese dioxide electrochemical cell which has improved storage life.

It is another object of our invention is to provide a zinc-manganese dioxide electrochemical cell which does not evolve large volumes of hydrogen, thereby preserving the structural integrity of the cell.

Still another object of our invention is to provide a reduced mercury containing zinc-manganese dioxide cell which has increased electrochemical performance at high rate discharges.

These objects, together with other and further objects of our invention which appear from the following description, are accomplished by our invention of the alkaline zinc-manganese dioxide electrochemical cells described herein.

SUMMARY OF THE INVENTION

We have discovered that the amount of mercury necessary to form the zinc/mercury amalgamated anodes of alkaline zinc-manganese dioxide cells can be significantly reduced without any deleterious effects on cell performance by including very small amounts of particular organic wetting agents to the zinc/mercury amalgam. To be effective in reducing the rate at which zinc is oxidized by alkaline electrolyte, while allowing for a decrease in the amount of mercury, our organic wetting agents must be siliconated materials which easily form dense films. The alkaline zinc electrochemical cells of our invention exhibit greater shelf life, an increased initial CCV and greater cell capacity than prior art cells having higher percentages of mercury in the zinc/mercury amalgam.

DETAILED DESCRIPTION OF THE INVENTION

Figure 1:
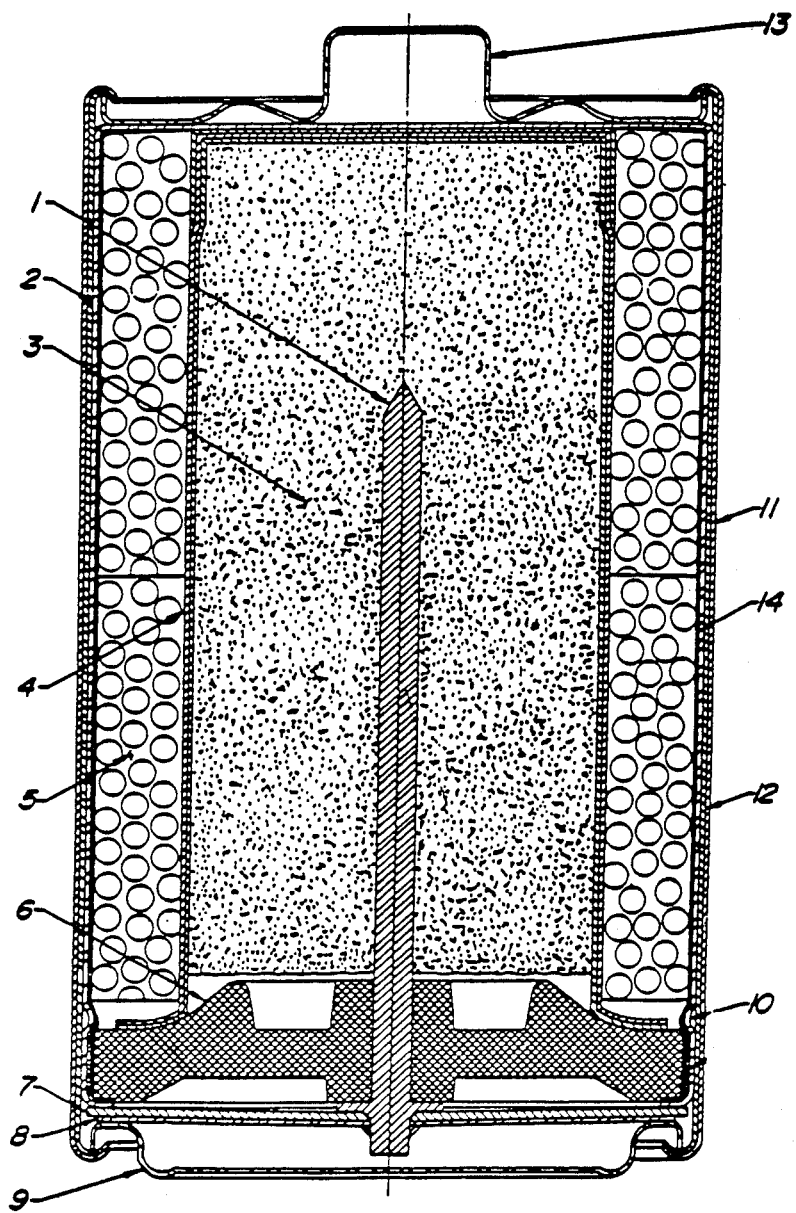

Our invention relates to alkaline zinc manganese dioxide electrochemical cells. Such electrochemical cells, which may be constructed in any one of several configurations have zinc (or a zinc alloy) as the anodic material and a compressed mixture of electrolytic manganese dioxide and a graphite as the cathodic material. The electrolyte of such cells is concentrated alkaline solution, usually a mixture of concentrated aqueous potassium hydroxide and a small amount of zinc oxide. In most alkaline zinc-manganese dioxide cells, the electrolyte is mixed into both the anode and cathode of the cell during its construction.

More particularly, our invention relates to the anodic portions of alkaline zinc manganese dioxide electrochemical cells. The anodic portions of such cells generally comprise a gellatenous mixture of zinc powder, electrolyte and a gelling agent such as CMC (carboxymethylcellulose or CPM (unneutralized carboxypolymethylene). Additionally, the anodic materials of such cells routinely include a corrosion inhibitor and/or a hydrogen gas suppressor in order to reduce the oxidation of the zinc by alkaline electrolyte and the corresponding evolution of hydrogen gas. Because of its electrochemical properties, for many years the corrosion inhibitor/hydrogen gas suppressor of choice has been mercury. Usually the mercury is added to the gelled anodic material during the blending of the gel. Since mercury is known to amalgamate with most other metals, upon its addition to the zinc powder, the mercury forms an amalgam with the zinc. Similarly, it is well known that the reduction in zinc corrosion of the zinc/mercury amalgams can be correlated directly with the proportion of mercury in the amalgams. While the actual amount of mercury used to form the amalgam varies according to many variables including zinc particle size, the electrical properties of the zinc and the conditions under which the anodic gel is blended, many gelled zinc anode formulations contain between six and twelve weight percent mercury (as a percentage of zinc).

The observed reduction in zinc corrosion is understood to be related to the often observed phenomena of the evolution of hydrogen gas when a metal is placed in contact with an acidic or alkaline solution. The measure of this phenomena is known as the hydrogen overvoltage. When the hydrogen overvoltage of a metal is low, the metal oxidizes readily, evolving hydrogen gas.

The hydrogen overvoltage is a function of the metal, the other reactant and the temperature; for a given metal and reactant the hydrogen overvoltage decreases as the reaction temperature increases. It has also been observed that with the same alkaline and at the same temperature, the hydrogen overvoltage of mercury is higher than the hydrogen overvoltage of zinc. Consequently, when mercury is added to zinc, the formed zinc/mercury amalgam has a higher hydrogen overvoltage than zinc alone. And as the amount of mercury in the amalgam increases, so does the hydrogen overvoltage.

It is hypothesized that mercury reduces the evolution of hydrogen from zinc particles, when reacting with alkaline, by coating the surface and the boundary layers of zinc particles. As the amount of mercury in the amalgam increases, the effectiveness of the coating increases. However, once the mercury content of the amalgam reaches a certain level, any additional mercury tends to migrate deeply into the zinc particle. The mercury which migrates deeply into the interior of zinc particles probably does not increase the hydrogen overvoltage.

Since an increase in the hydrogen overvoltage indicates that zinc is being oxidized more slowly, electrochemical cells having mercury as part of the gelled anode exhibit an increase in cell capacity after storage due to a smaller decrease in the amount of usable anode. Moreover, an increase in the hydrogen overvoltage prevents the build-up of hydrogen gas within the cell, which if left unchecked, can cause an explosion or otherwise destroy the structural integrity of the electrochemical cell. Consequently, since the rate hydrogen evolution increases with temperature, it was well known to provide for sufficient mercury in alkaline electrochemical cells, especially those being stored at high temperatures or for prolonged periods of time.

In order to discover the parameters of our invention, we prepared gelled anodic materials usable alkaline-zinc manganese dioxide cells. Two slightly differing gels having the following formulations were made:

|  | Formulation A | Formulation B |
| --- | --- | --- |
| Battery grade zinc powder | 63% | 55% |
| 2% Mercury (as % zinc) | 1.3% | 1.1% |
| Electrolyte (Zinc oxide in potassium hydroxide) | 35.2% | 42% |
| Gelling agent | 0.4% (CPM) | 1.8% (CMC) |
| Additive (based on zinc content) | varied | varied |

In all of the gels made according to a particular formulation, the percentages of zinc, mercury and electrolyte were kept constant, with only the amount of gelling agent being varied according to the amount of additive being used.

The gels were made in variable speed mixers equipped with auxiliary equipment such as spray nozzles and shut-off valves. First zinc powder and the gelling agent were blended in a sealed mixer for at least five minutes. To this mixture approximately one-half of the electrolyte was added. Once the mixture, upon blending, appeared to have a viscous dry appearance, the mercury was added, immediately followed by the addition of an additive, e.g., an organosiliconate. After blending for ten minutes, the remaining electrolyte was added. The entire blend was mixed for about five minutes and then allowed to stand for thirty minutes. After blending for an additional one minute, the mixers were stopped. Once fresh air was introduced to the system, the mixers were opened and the gel removed. In order to approximate the use of gels in actual cells, the gels were ground in an ordinary food grinder to remove any lumps which could plug metering equipment during cell manufacture.

We tested for gel gassing by placing about twelve (12) grams of gel into a test tube. The gel was then covered by mineral oil. A graduated pipette was then placed so as to contact the surface of the mineral oil and sealed to the test tube with an appropriate sealing member. After seven days at 160° F., the level to which mineral oil had advanced into the pipette was determined. Since hydrogen gas which evolved from the gel was trapped at the interface of the gel and mineral oil, any rise in the level of the mineral oil into the pipette corresponded to the amount of hydrogen gas evolving from the gel. To further test our invention, we constructed several cylindrical alkaline zinc-manganese dioxide cells according to FIG. 1. According to FIG. 1, the positive current collector is a drawn steel container (2), open on one end and about 0.010 inches thick. The cathode consists of two annular rings (5) comprised of a compressed mixture electrolytic manganese dioxide, graphite and alkaline electrolyte which are placed in contact with the positive current collector. A bead (10), is formed into the container near the open end to support the sealing disk. A separator (4) is placed between the cathode rings and the anode gel (3) which is comprised of powdered zinc, a gelling agent, the electrolyte and mercury. A sealing disk (6) to which sealant (15) has been applied and containing a negative current collector (1) is placed into the open end of the container and in contact with the bead. The open end of the container is crimped over the sealing disk thus compressing it between the crimp of the container on to which the coating (14) has been applied and the bead to seal the cell. An insulation washer (7) with a central aperture is placed over the crimped end of the cell such that the end of the negative current collector (1) protrudes through the aperture. A contact spring (8) is affixed to the end of the negative current collector (1). Terminal caps (9) and (13) are placed into contact with the contact spring (8) and the positive current collector (2), respectively, and an insulating tube (12) and steel shell (11) are placed around the cell and crimped on their ends to hold the terminal caps in place.

The utility of our invention will now be explained through several examples and experiments.

Example 1—Importance of Mercury

The importance of mercury to the stability of alkaline zinc-manganese dioxide gels was determined by measuring the evolution of gas from gels of Formulation B containing varying amounts of mercury in the amalgam but no other gas suppressing additives. As shown in Table 1, increases in the amount of mercury in the anodic gel cause substantial increases the amount of gas evolved from gel.

TABLE 1

Gassing in Zinc Anodic Gels v. Mercury Content

| % Mercury | Gas Evolved (Average) (uL/g/day @ 160° F.) |
|---|---|
| 7 | 8.94 |
| 4 | 15.9 |
| 3 | 21.7 |
| 2 | 31.5 |

The amount of hydrogen gas evolving from the gel is an indication of the stability of alkaline zinc electrochemical cells.

As Table 1 illustrates, mercury must be included in alkaline-zinc electrochemical cells if such cells are to be useful. And since cell stability increaees with the amount of mercury, those in the art would like to utilize relatively substantial amounts of mercury. However, because mercury is extremely toxic to humans, other animals and the environment generally, it is imperative for battery manufacturers to reduce the amount of mercury in alkaline zinc-manganese dioxide cells. In fact, since mercury is not generally biodegradable, but rather tends to accumulate in the environment and in the organs of living things, there are many regulatory efforts to reduce or eliminate all potential sources of mercury.

We have discovered that the amount of mercury used in alkaline zinc-manganese dioxide cells can be reduced to as little as 0.25%, if certain organosiliconate materials are incorporated into the zinc/mercury amalgam. Organosiliconate materials of our invention apparently coat the surface of the zinc/mercury amalgam, which results in an increase in the hydrogen overvoltage. While the mechanism is not fully understood, it is believed that the coated zinc/mercury amalgam causes hydrogen gas to evolve even more slowly, either by forming a physical barrier to the evolution hydrogen gas, or by increasing the efficiency of the mercury in preventing the formation of hydrogen.

Several of the following examples qualitatively describe the organosiliconates of our invention. In these examples, the films formed by the organosiliconate materials of our invention dramatically decrease the hydrogen evolution from the zinc/mercury amalgams during reactions with alkaline electrolytes that the amount of mercury necessary to form amalgams with zinc which effectively reduce the corrosion of the zinc is substantially reduced Example 2—Effect of Organosiliconate Additive To quantitatively determine the effects of our organosiliconate additives on the hydrogen gassing of the anodic gels of alkaline zinc-manganese dioxide cells, we studied the gassing rates of gels containing 40 PPM and 0 PPM of a preferred organosiliconate. The results of this study, in which the gels were made according to Formulation B are summarized in Table 2.

TABLE 2

Gel Gassing vs. Amount of Mercury (uL/gm/day @ 160° F.)

| | Mercury in Zinc Amalgam | | | |
|---|---|---|---|---|
| | 7% | 4% | 3% | 2% |
| Without organosiliconate | 8.94 | 15.9 | 21.7 | 31.5 |

TABLE 2-continued

| Gel Gassing vs. Amount of Mercury (uL/gm/day @ 160° F.) | | | | |
|---|---|---|---|---|
| | Mercury in Zinc Amalgam | | | |
| | 7% | 4% | 3% | 2% |
| With organosiliconate | — | 3.15 | 2.26 | 2.5 |

As pointed out in Table 3, at low mercury concentrations, the inclusion of 40 PPM of our organosiliconate reduces gel gassing by almost 90% or more. In fact, when 40 PPM of our orqanosiliconate is included in the gel, a 70% reduction in the amount of mercury still shows about 70% reduction in hydrogen gassing.

To determine whether our organosiliconate additives affected actual cell performance, we constructed two sets of cells having gels made according to Formulation B. The "control" set of cells contained no organosiliconate additive and the other set of cell contained gels having 40 PPM of our preferred organosiliconate additive. The electrical performance of the cells, measured upon manufacture and after one month storage at 130° F., is summarized in Table 3.

TABLE 3

| Battery Performance (2.2 ohm HIFT) | | | | |
|---|---|---|---|---|
| | Control | | Formulation B | |
| | 0 mo. | 1 mo. | 0 mo. | 1 mo. |
| Mins. to 0.90 V | 1099 | 1006 | 1110 | 1007 |
| Mins. to 0.75 V | 1367 | 1244 | 1367 | 1297 |
| Mins. to 0.65 V | 1480 | 1378 | 1546 | 1478 |

From Table 3 it is clear that overall cell performance improves, even with a reduction in the amount of mercury in the anode of the cell, when the anodic mixture includes just 40 PPM organosiliconate. The effectiveness of our organosiliconate additive increases when the storage temperature is increased. For example, while the batteries having 7% mercury in their anodes lost 7% of their capacity after one month's storage at high temperature, as measured to a low voltage end-point, batteries having anodes containing 2% mercury/40 PPM organosiliconate lost only 5% of their capacity.

Example 3—Amount of Organosiliconate Additive

The amount of organosiliconate which must be added to the zinc gel in order to permit a substantial reduction in the amount of mercury is quite small. We have found that optimally between 20 PPM and 160 PPM of organosiliconates of our invention should be added. Table 4 shows the effect on hydrogen gassing of adding various amount of our preferred organosiliconate material to anodic zinc gels of Formulation B.

TABLE 4

| Gel Gassing vs. Additive Amount | |
|---|---|
| Organosiliconate Content | Gel Gassing (uL/gm/Day) @ 160° F. |
| 0 | 48.35 |
| 20 PPM | 5.5 |
| 40 PPM | 4.92 |
| 160 PPM | 3.82 |
| 0.16% | 8.30 |
| 0.32% | 18.60 |
| 0.5% | 12.85 |
| 1.0% | 20.61 |

From Table 4, it is apparent that our organosiliconate additives increases the hydrogen overvoltage of the zinc/mercury amalgam. Table 4 also points out that the decreases in gel gassing rates provided by our organosiliconates, are not linear, since generally our organosiliconate additives become less effective when used at concentrations of greater than 0.16 percent.

The organosiliconates of our invention are film forming organic wetting agents. While the precise formulation of our preferred organosiliconate, DC-193 TM, is proprietary information of its manufacturer, Dow Corning, it is marketed as a non-hydrolyzable silicone glycol copolymer having a viscosity of approximately 465 CS and a density of 1.00 to 1.10. A chemical analysis of DC-193 TM shows that our preferred organosiliconate material is 13–16% silica, 67–22% ethylene oxide and has a pH of 4–7 in a 5% water solution.

Example 4—Comparisons to Other Organic Wetting Agents

While our organosiliconate of choice, DC-193 TM, is an organic wetting agent, not all organic wetting agents provide for the reduction in the rate of gassing of zinc/mercury amalgam gels. In fact our invention only encompasses those organic wetting agents which have a substantial siliconate component. For example, Table 5 gives the results of tests of gels of Formulation A in which the other organic wetting agents are varied.

TABLE 5

| Gel Gassing v. Wetting Agent (uL/g/day @ 160° F.) | | |
|---|---|---|
| Wetting Agent | 40 PPM | 160 PPM |
| DC-193 TM | 6.03 | 3.82 |
| Modified Polyethylene Glycol | 41.3 | 37.9 |
| Polyethylene Glycol | 30.9 | 6.77 |

From Table 5 it is apparent that the reduction in the corrosion of the zinc/mercury amalgam gels is not merely caused by the addition of an organic wetting agent. Instead, Table 5 shows the gel gassing is substantially reduced, especially at low concentrations of organic wetting agents, only when the wetting agent is siliconated. While the exact mechanism of the wetting of the surface of the zinc/mercury amalgam is not fully understood, we hypothesize that the siliconate portion of the DC-193 aids in its adsorption on the zinc surface. Although other wetting agents, such as glycols, wet the surface of the zinc and may form a partial film on it, our preferred organosiliconate which is comprised of a small quantity of siliconate forms a more efficient film. The more efficient film formed by the DC-193 TM is probably due to the adsorption of the zinc caused by the union of the zinc powder and the siliconated functionality of the organic material.

Example 5—Comparisons to Other Organosiliconates

Although the organic wetting agent must be siliconated, we have determined that not all organosiliconates provide for a reduction in the gassing of zinc gels. For example, Table 6 gives the result of test of cells having zinc/mercury amalgam gelled anodes according to Formulation A, where our preferred organosiliconate, DC-193 TM, is replaced with other organosiliconates.

TABLE 6

| Gel Gassing As A Function Of Organosiliconate (uL/gm/Day @ 160° F.) | | | |
|---|---|---|---|
| Compound | Organosiliconate | 40 PPM | 160 PPM |
| A | DC-193 TM | 6.03 | 3.82 |
| B | Polydimethylsiloxane- | | |

TABLE 6-continued

Gel Gassing As A Function Of Organosiliconate
(uL/gm/Day @ 160° F.)

| Compound | Organosiliconate | 40 PPM | 160 PPM |
|---|---|---|---|
|  | Polyoxyethylene copolymer | 17.6 | 10.1 |
| C | Non-hydrolizable siliconelycol Copolymer | 12.3 | 3.15 |
| D | Phosphoate functional silate | 23.3 | 23.8 |
| E | Polydimethylsiloxane | 30.9 | 31.3 |
| F | Sodium Dimethylsiloxane | 39.4 | 24.1 |

[Gassing of gels without any additive is 14.2]

Table 6 shows that at low concentrations, our preferred material DC-193 TM, is at least twice as effective in reducing gel gassing as any other organosiliconate tested. Again while the mechanism is not known, we believe that the advantage noted with all of the organosiliconates of our invention, i.e., A, B and C of Table 6, can be attributed to their adsorptive film forming capabilities. We believe that the other organosiliconates, i.e., D, E and F of Table 6, do not form adsorptive films. To effectively reduce gel gassing, we believe Table 6 shows that a very thin, adsorptive film must be formed on the surface of the zinc/mercury amalgam.

The organosiliconates of our invention can be used as an additive in mercury containing anodic zinc gels containing other well known gas suppressors such as indium and/or lead. For example, Table 7 gives the results of leakage tests of batteries having gels of Formulation A, wherein 100 to 200 PPM of indium is added as an additional gas suppressor.

TABLE 7

Battery Leakage vs. Addition of Indium/Organosiliconate
(% Leakage in Cells Discharged @ 160° F.)

| % Hg | 7 | 2 | 2 | 2 | 2 |
|---|---|---|---|---|---|
| % indium | — | 100 | 200 | 100 | 200 |
| % organosiliconate | — | 40 | 40 | 20 | 20 |
| 1 week | 0 | 0 | 0 | 0 | 4 |
| 2 weeks | 0 | 0 | 0 | 0 | 8 |
| 3 weeks | 44 | 0 | 0 | 0 | 36 |
| 4 weeks | 44 | 0 | 0 | 0 | 36 |

While the test results given in Table 7 are not unequivocal, it does appear that indium and organosiliconate, especially at higher levels of organosiliconate may effectively reduce the gassing of hydrogen as determined by cell leakage.

As shown in Table 8, indium and our organosiliconates increase cell performance at least at room temperature of batteries in which the zinc powder of the anode (before gelling) comprises 500 PPM lead. The gels used in the batteries tested and reported in Table 8 comprised Formulation 8.

TABLE 8

Battery Capacity - 500 PPM Pb/2% Hg in Anode
(40 ohm cont. hours)

| % indium |  | — | 200 | 100 | 200 | 100 |
|---|---|---|---|---|---|---|
| % Organosiliconate |  | — | 40 | 40 | 20 | 20 |
| RT | 1.10 | 46.4 | 53.0 | 54.5 | 53.8 | 54.4 |
|  | .90 | 62.8 | 72.7 | 73.0 | 72.1 | 74.8 |
| 0° C. | 1.10 | 12.5 | 12.2 | 13.3 | 12.9 | 12.8 |
|  | .90 | 18.2 | 17.5 | 21.7 | 17.3 | 29.3 |

As shown in the foregoing examples, it is evident that the zinc anodes of alkaline zinc manganese dioxide electrochemical cells of our invention corrode at a slower rate than cells of the prior art. The inhibition of the oxidation of the anode allows cells of our invention to retain more of their capacity during storage, particularly at higher temperatures. And while the foregoing examples demonstrated the effectiveness of our invention in alkaline zinc-manganese dioxide electrochemical system in a commercial cylindrical configuration, our present invention includes other configurations of the alkaline zinc-manganese dioxide electrochemical system.

What is claimed:

1. An alkaline zinc electrochemical cell having a manganese dioxide cathode, a zinc anode containing no more than four percent mercury based on the weight of zinc and an alkaline electrolyte, said zinc anode further comprising a zinc corrosion and hydrogen gas inhibiting amount of a siliconated, film-forming organic wetting agent, wherein said siliconated, film-forming organic wetting agent further provides for improved storage stability and cell capacity under comparable conditions for said cell as provided by a cell otherwise identical except having an absence of said siliconated, film-forming organic wetting agent.

2. The alkaline zinc electrochemical cell of claim 1, wherein the amount of said siliconated film-forming organic wetting agent is less than 0.16 percent by weight of zinc.

3. The alkaline zinc electrochemical cell of claim 2, wherein the amount of said siliconated film-forming organic wetting agent is less than 0.01 percent by weight of zinc.

4. The alkaline zinc electrochemical cell of claim 1, wherein said mercury is present in the anode in an amount less than two percent based on the weight of zinc.

5. The alkaline zinc electrochemical cell of claim 1, wherein the alkaline electrolyte is concentrated aqueous potassium hydroxide having a minor amount of zinc oxide.

6. The alkaline zinc electrochemical cell of claim 1, wherein the anode further comprises a portion of said alkaline electrolyte and a gelling agent, said consistuants of said anode being mixed together to form a gel prior to incorporation into the cell.

7. The alkaline electrochemical cell of claim 6, wherein the said gelling agent is selected from the group consisting of carboxymethylcellulose and carboxypolymethylene.

8. A process for inhibiting zinc corrosion and hydrogen gassing in an alkaline zinc electrochemical cell having a predominantly zinc anode containing less than four percent mercury by weight zinc, a manganese dioxide cathode and an alkaline electrolyte, said process comprising incorporating into said anode a zinc corrosion and hydrogen gas inhibiting amount of a siliconated, film-forming organic wetting agent.

9. The process of claim 8, wherein the amount said siliconated, film-forming organic wetting agent is less than 0.16 percent by weight of zinc.

* * * * *

UNITED STATES PATENT AND TRADEMARK OFFICE
CERTIFICATE OF CORRECTION

PATENT NO. : 4,857,424
DATED : August 15, 1989
INVENTOR(S) : Duane M. Larsen, et al.

It is certified that error appears in the above-identified patent and that said Letters Patent is hereby corrected as shown below:

| Column | Line | |
|---|---|---|
| 2 | 7 | Please delete "oxides" and insert --oxidizes--. |
| 2 | 45 | Please delete "alkalineo" and insert --alkaline- --. |
| 4 | 33 | Please delete "particle." and insert --particles.--. |
| 4 | 51 | Please insert --in-- after "usable". |
| 5 | 31 | Please begin a new paragraph between "gel." and "To". |
| 5 | 33 | Please delete "b". |
| 5 | 37 | Please insert --of-- after "mixture". |
| 6 | 3 | Please insert --in-- after "increases". |
| 6 | 20 | Please delete "increaees" and insert --increases--. |

UNITED STATES PATENT AND TRADEMARK OFFICE
CERTIFICATE OF CORRECTION

PATENT NO. : 4,857,424

DATED : August 15, 1989

INVENTOR(S) : Duane M. Larsen, et al.

It is certified that error appears in the above-identified patent and that said Letters Patent is hereby corrected as shown below:

| Column | Line | |
|---|---|---|
| 6 | 41 | Please insert --of-- after "evolution". |
| 7 | 19 | Please delete "cell" and insert --cells--. |
| 9 | 9 | Please delete "siliconelycol" and insert --siliconeglycol--. |
| 10 | 65 | Please insert --of-- after "amount". |

Signed and Sealed this

Twelfth Day of June, 1990

Attest:

HARRY F. MANBECK, JR.

*Attesting Officer*     *Commissioner of Patents and Trademarks*